(No Model.)
J. CLARK.
METHOD OF REDUCING METALS FROM THEIR ORES.
No. 277,885. Patented May 22, 1883.
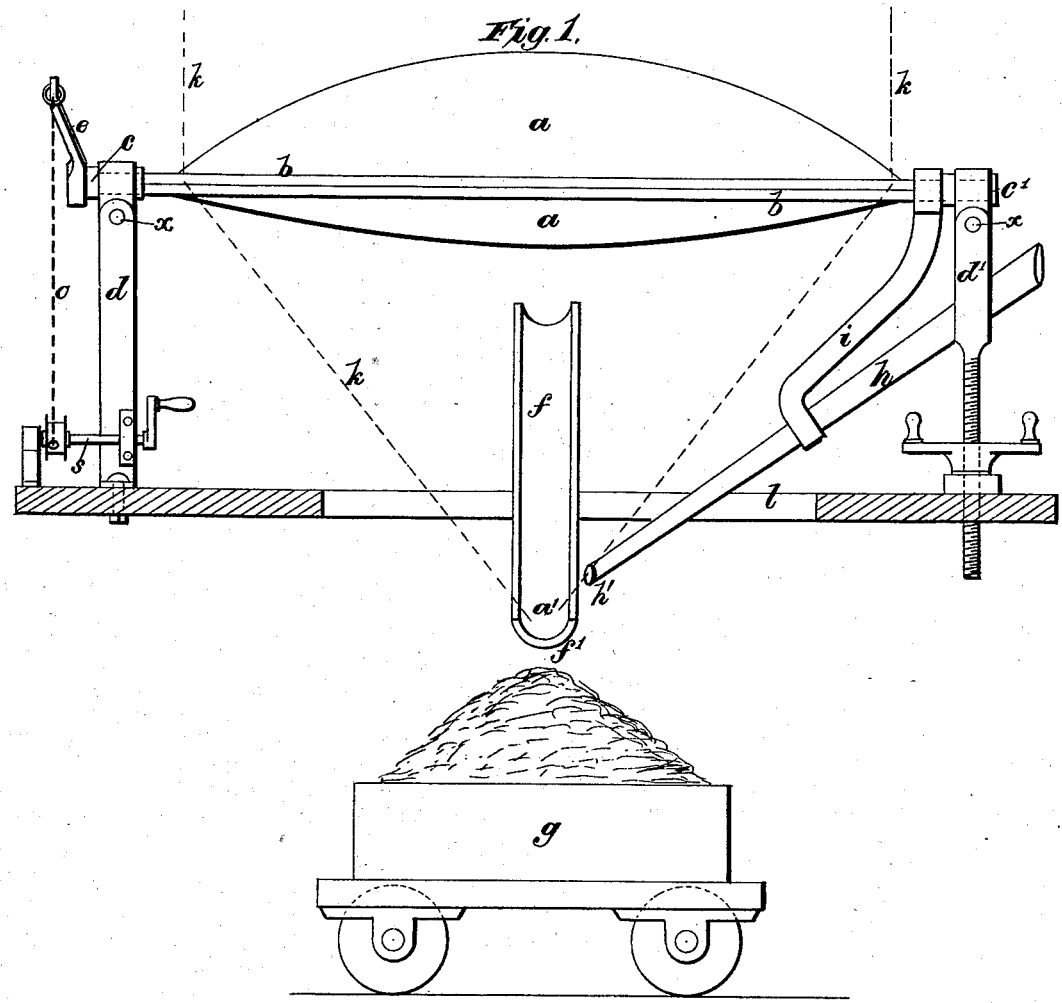
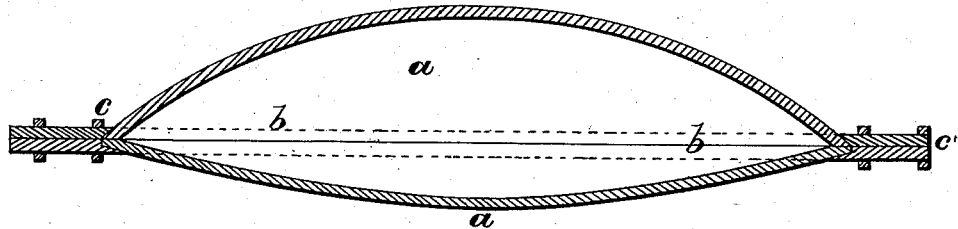
Witnesses.
Robert Everett
George Tilghman
Inventor.
John Clark.
By W. H. Babcock.
Atty.

UNITED STATES PATENT OFFICE.

JOHN CLARK, OF SILCHESTER ROAD, KENSINGTON, COUNTY OF MIDDLESEX, ENGLAND.

METHOD OF REDUCING METALS FROM THEIR ORES.

SPECIFICATION forming part of Letters Patent No. 277,885, dated May 22, 1883.

Application filed January 26, 1883. (No model.)

*To all whom it may concern:*

Be it known that I, JOHN CLARK, a subject of the Queen of Great Britain, residing at Silchester Road, Kensington, in the county of Middlesex, England, metallurgist, have invented a new and useful Improvement in Reducing Metals from their Ores; that the same has not been patented to me nor to others, with my knowledge or consent, in any country, and that the following specification, reference being had to the accompanying drawings, forming part thereof, is a full and correct description of the invention, such as will enable others skilled in the art to which it appertains to make and use the same.

This invention relates to improvements in reducing metals from their ores by means of the following apparatus. The greater part of ores, whether natural or artificially prepared, are oxides or chlorides of the metals combined with them, and it is these more especially that my apparatus is suited to reduce.

In order to make the object of my invention better understood, I will first briefly refer to the ordinary method of reducing metals from their ores, and show the improvements which this invention effects therein.

The necessary heat, in ordinary practice, is obtained by the rapid and forced combustion of gaseous, liquid, or solid fuel in its combination with oxygen gas in a suitable furnace. To raise the intense heat required a large volume of atmospheric air, which contains only one-fifth of its volume oxygen or the gas required in the operation, has to be forced through the furnace. The necessary abstraction of the heat so produced in heating the four-fifths of neutral gas or nitrogen contained in the air is a great loss, which loss this invention prevents, as hereinafter explained. Further, when air is forced into the furnace, the first product is carbonic-acid gas, and, as it ascends in the furnace, the incandescent fuel takes up one atom of oxygen from it, thereby forming carbonic-oxide gas; but in doing so it absorbs a considerable quantity of the heat first produced in the formation of carbonic acid, which is a loss, and which is prevented by this invention, as hereinafter explained. The carbonic oxide produced and the uncombined carbon of the remaining fuel are the principal reducing agents in the furnace; but so long as they can combine with an atom of oxygen from the air they do not attack the oxide of the metal to be reduced; and, further, from the large volume of air necessary to raise the intense heat required, and yet to avoid too much air being introduced, thereby forming carbonic-acid gas in excess, which has no reducing property whatever, there is a large and variable loss, which this invention prevents, because it provides the heat necessary for the reduction of oxides without the use of oxygen from the air or any other source.

The oxyhydrogen blow-pipe produces the most intense artificial heat hitherto attained; but its reducing-power, owing to the quantity of oxygen required to generate it when applied to reduce refractory ores or oxides, is very small, while its cost prevents its practical application for such a purpose. By this invention I get a heat approaching that produced by the oxyhydrogen blow-pipe, and, as no oxygen is required to produce it or to interfere with the after-reduction of the oxide under treatment, I effect the reduction of such oxides by simply heating them to a similar degree, at the same time blowing hydrogen gas or other reagent upon the incandescent oxide, thereby effecting its reduction direct.

I now proceed to describe the apparatus whereby I carry my said invention into practice, referring to the accompanying drawings by the reference-letters marked thereon.

Figure 1 shows a general arrangement of the apparatus; and Fig. 2 shows a hollow lens, which is filled with a transparent liquid, and may be used, if desired, in place of the solid lens shown in Fig. 1.

$a$, Fig. 1, is a large and powerful lens or burning-glass to concentrate the rays of the sun to a focus at $a'$. It is made of solid glass, crystal, or other suitable transparent material. It is held in place by a rim-case, $b$, having two trunnions or journals, $c\ c'$, upon which it can oscillate as required. It is supported at one side upon a fixed bracket, $d$, and is supported at the other side upon an adjustable screw, $d'$, to enable such lens to be set true with the elevation of the sun, as determined by the latitude and season of the year, the pins $x\ x$ allowing such movement freely. Said bracket and screw support or are formed with the bearings in which said trunnions are journaled. In order to give such lens the necessary diurnal movement to follow the course of the sun by day, I fit a lever, $e$, upon the trunnion $c$, and connect it by a rope or chain, $o$, to a spindle, $s$, which may have the necessary motion imparted to it by hand, as shown; but I prefer to effect such motion by a train of clock-work or by the dropping of a liquid, so as to impart a regular and progressive motion to the said lens, as required; or, instead of the lever $e$, I fit a toothed quadrant, worked by a worm-screw, to effect the same object, and when I construct several such lenses to work together I connect their several levers by suitable rods, so as to work the series simultaneously.

$f$ is a spout or channel wherein is carried the ore to be treated, and having its delivery end $f'$ near the focus $a'$, so that the ore, when it has been reduced, may fall into a truck, $g$, or other receptacle for removal. The spout $f$ is inclined, so that the ore may fall forward to the delivering end $f'$; or the ore may be pushed forward by a scraper for the same purpose. The truck $g$ is shown very much reduced in size compared with the other parts of the apparatus, merely to show its relative position.

The gaseous or liquid reagent, hereinafter described, is conveyed through the pipe $h$, which has its delivery end $h'$ near to the focus $a'$ of the lens. The pipe $h$ is supported by an arm, $i$, fixed to the trunnion $c'$, so as to move the pipe $h$ with the lens $a$ in its diurnal motion and maintain its delivering end $h'$ near to the focus $a'$.

I use any of the ordinary well-known reducing reagents for blowing or impinging upon the ore after it has been raised to the necessary heat by being exposed in the focus $a'$, as described. Gaseous or liquid reagents I blow through the pipe $h$, which is connected by any suitable means to a tank or reservoir containing such reagents. When I use a solid reagent—such as carbon or carbonaceous matter—I prefer to intimately mix such reagent with the ore before exposing it in such focus; but at the same time I blow through the pipe $h$ any neutral gas to prevent the reoxidation of the reduced metal.

While this invention provides the necessary heat for the reduction of ores by the means described, it also takes practical advantage of the well-known fact that chlorine and hydrogen gases combine, in sunshine, with great energy, and in reducing chlorides of metals especially. This invention, from the greater intensity of the sun's rays, rapidly effects the reduction of such chlorides by the usual reagents—as hydrogen or carbureted hydrogen gas—without the usual reagents, sodium or potassium, which are much more expensive.

The dotted lines $k$ indicate the converging rays of the sun to the focus $a'$, and $l$ is the floor-line.

In another application, numbered 83,098, I have described and shown the use of a concave mirror for concentrating the sun's rays on ores to reduce the latter, the mirror being provided with devices which cause it to follow the course of the sun, and with additional devices which hold the ores in the focus of said mirror.

I do not specifically claim herein the construction last above described, although my first claim is generic and broad enough to include either a mirror or a lens.

Having thus particularly described my said invention and the means whereby it may be carried into effect, what I claim as novel, and desire to secure by Letters Patent, is—

1. The method of reducing metals from their ores, consisting in melting or disintegrating the same by solar rays concentrated in a focus and simultaneously applying carbonaceous reagents, whereby ores containing chlorides may be reduced without the use of sodium or potassium, substantially as set forth.

2. In an apparatus for reducing metals from their ores by the use of the solar rays, a journaled lens, in combination with a vertically-adjustable bearing for one of its journals or gudgeons, and means for supporting ores in the focus of said lens, for the purpose set forth.

3. The journaled lens $a$, in combination, with handle or crank-arm $e$ and devices for operating the same, a trough, $f$, arranged below said lens, the pipe $h$ for applying reagents, and the arm $i$, which moves with the lens and supports said pipe, substantially as set forth.

In testimony whereof I affix my signature in the presence of two witnesses.

JOHN CLARK.

Witnesses:
WILLIAM COOKE,
JOSEPH LOW.